Dec. 7, 1943.    R. O. HELGEBY    2,336,172
TACHOMETER
Filed Oct. 20, 1941

Inventor
Ralph O. Helgeby
By Blackmore, Spencer & Hunt
Attorneys

Patented Dec. 7, 1943

2,336,172

UNITED STATES PATENT OFFICE 2,336,172

TACHOMETER

Ralph O. Helgeby, Flint, Mich., assignor to General Motors Corporation, Detroit, Mich., a corporation of Delaware Application October 20, 1941, Serial No. 415,703

1 Claim. (Cl. 264—13)

This invention relates to tachometers. A demand exists for a tachometer which shall be efficient, but which can be sold at a low price. Such an instrument is needed particularly by persons having home work shops. This invention seeks to provide an article to supply this demand and it has for its object, therefore, a tachometer which shall possess a high degree of efficiency, but which shall make use of but a small number of relatively inexpensive parts which can be easily and quickly assembled.

The accompanying drawing shows such an instrument.

Figure 1:
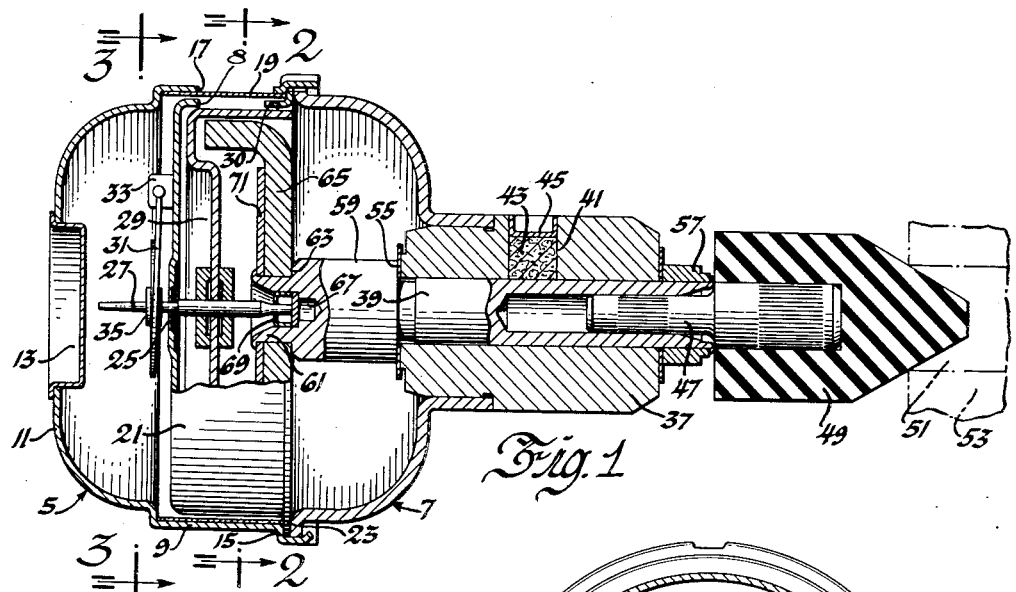
Figure 1 is a longitudinal section.
Figure 2:
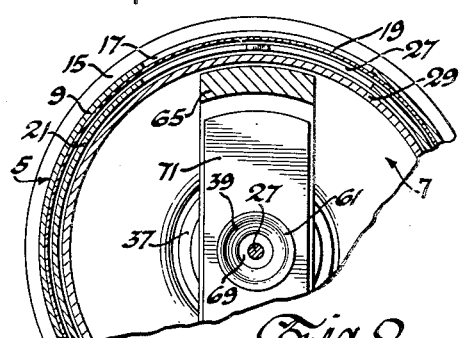
Figure 2 is a section on line 2—2 of Figure 1.
Figure 3:
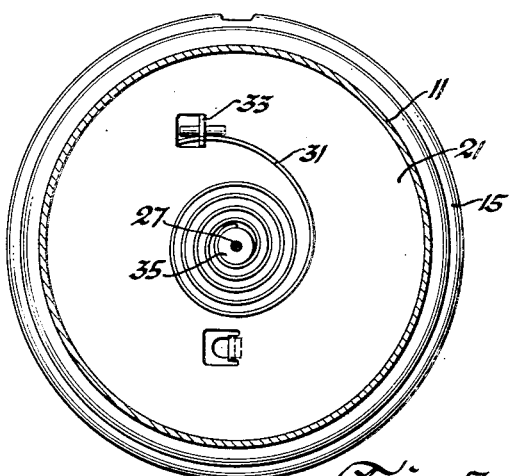
Figure 3 is a section on line 3—3 of Figure 1.

Referring to the drawing, numerals 5 and 7 represent two cup-shaped casing members made from inexpensive material. Member 5 has a cylindrical wall 9 extending from a partly spherical end 11. Into an opening of this end is fitted a plug 13. At the end of wall 9 there is formed a radial flange 15. Wall 9 has an opening 17 internally covered by a transparent plate of suitable material marked 19.

Figure 4:
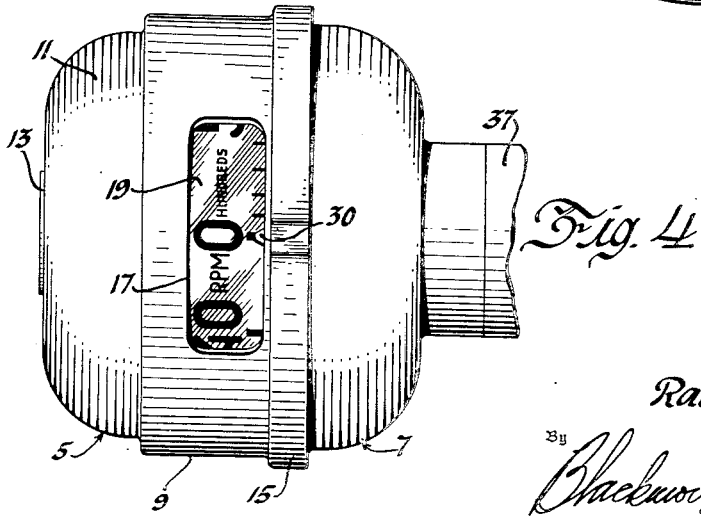
Figure 4 is a view in elevation of the assembled instrument.

The tachometer is of that well-known kind having a rotatable permanent magnet, a fixed field cup and a rotatable speed cup. The field cup is marked 21. It has a radial flange 23. The base of the field cup has at 25 an aperture serving as a bearing for the spindle 27 of the speed cup 29. To register with opening 17 of the casing wall 9 is an opening 8 in the field cup. There are suitable indicia on the speed cup as shown by Figure 4 to cooperate with a lug 30 on the field cup wall whereby readings are determined. To return the speed cup to its zero reading, there is a hair spring 31 anchored at one end to a tongue 33 bent up from the field cup. At its other end the hair spring is attached to a washer 35 carried by the spindle. This washer serves also to limit axial movement of the speed cup and spindle.

The rotation of the speed cup is effected by eddy currents produced by the rotation of a permanent magnet at a rate corresponding to the rate of rotation of the shaft the speed of which is to be determined. To that end casing member 7 is press fitted to a hub or shaft bearing 37 within which rotates shaft 39. To provide anti-frictional rotation, the hub has a radial opening 41 containing an oil saturated wick 43 and a plug 45 closes the opening. Shaft 39 is recessed axially to receive non-rotatably a drive spindle 47 to which is fitted a knurled shaft engaging tip 49, the latter to engage a suitable recess 51 in shaft 53 which is the shaft the speed of which is to be determined. Shoulder 55 and spacer 57 retain shaft 39 from axial movement in the hub. Shaft 39 is enlarged as at 59 and its end is reduced as at 61 to form a shoulder 63 against which is seated a permanent magnet 65 which may be of U-shape. The end of shaft 37 is apertured as at 67 and provided with a bearing 69 for the speed cup spindle. A temperature compensator may be used. One is shown at 71 positioned adjacent the magnet. The magnet and compensator are held in position by peening over the metal around the opening 67.

After the field cup with the speed cup and its spindle are assembled as shown in Figure 1, with the flange of the field cup against the flange of casing member 5, the casing member 7 with hub 37 and the magnet carrying shaft 39 is placed in position, the speed cup spindle being received with bearing 69. Parts of the periphery of casing member 5 are then crimped over the adjacent part of casing member 7 to complete the assembly.

With tachometer completely assembled, the magnet may then be magnetized to some degree of success. It is then calibrated by a process of demagnetizing and if necessary the cap 13 may be removed and a final correction made by adjusting the hair spring at 33.

An instrument as described will be quite inexpensive. It is light, small and can be easily carried about. It will be quite accurate and will supply the demand for a reasonably priced serviceable tachometer.

I claim:

A tachometer comprising a shaft, a magnet carried thereby, a speed cup surrounding said magnet, a spindle carrying said speed cup, a field cup having a circular bottom wall and a side wall surrounding said speed cup, said speed cup spindle being journalled in the bottom wall of the field cup and in the end of said shaft, said field cup side wall having a radial flange, a two part casing, a first part having a radial flange engaging said field cup flange, the second casing part having a radial flange engaging the opposite face of the field cup flange, one of said casing flanges having an extended portion crimped over the flange of the other part to hold said casing parts and field cup in assembled relation, the second casing part having an axially apertured hub secured thereto, said magnet carrying shaft being journalled in said hub and extended outwardly therefrom, a tapered tip on said shaft extension for contact with a rotatable member the speed of rotation of which is to be determined.

RALPH O. HELGEBY.